United States Patent Office 3,434,775
Patented Mar. 25, 1969

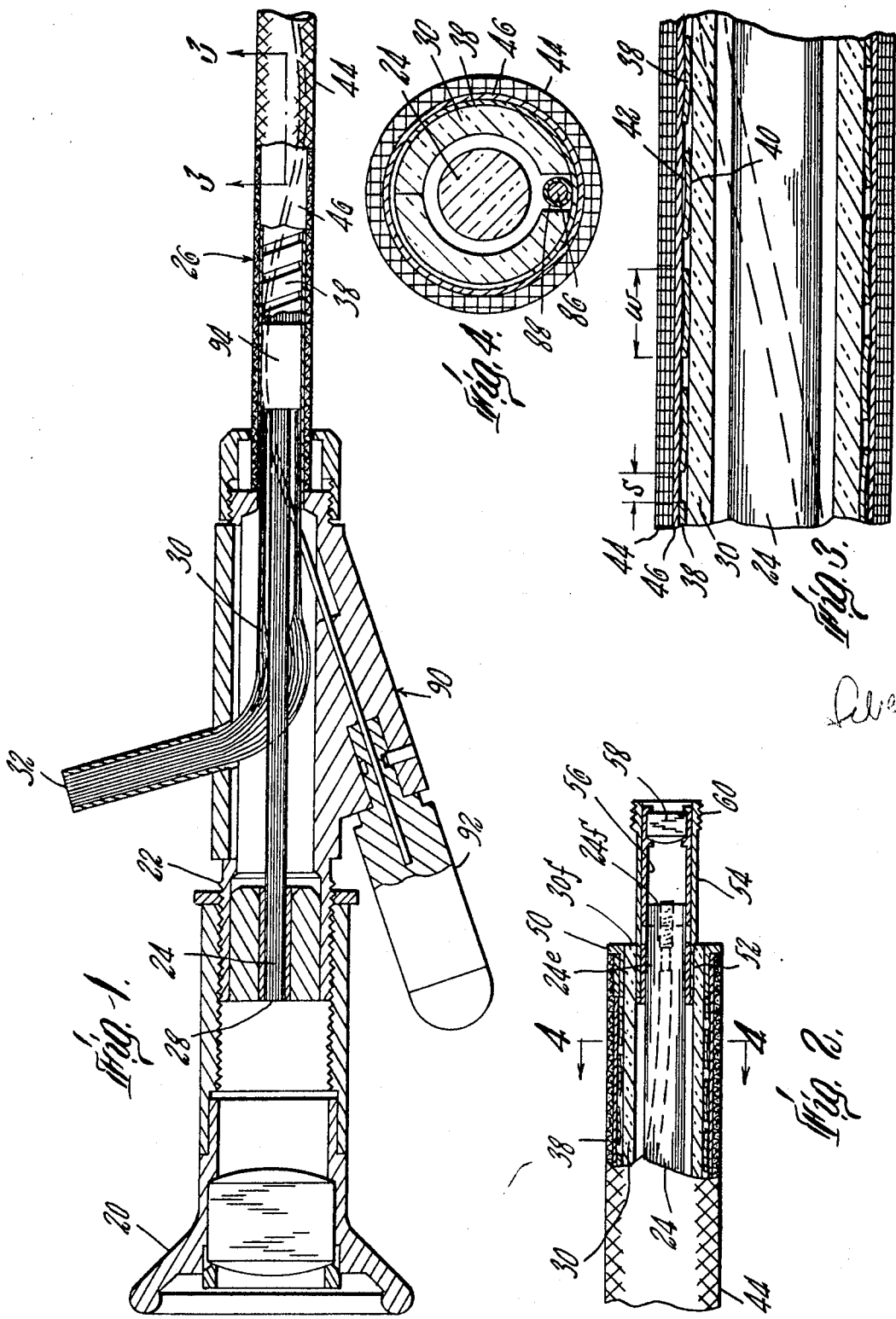

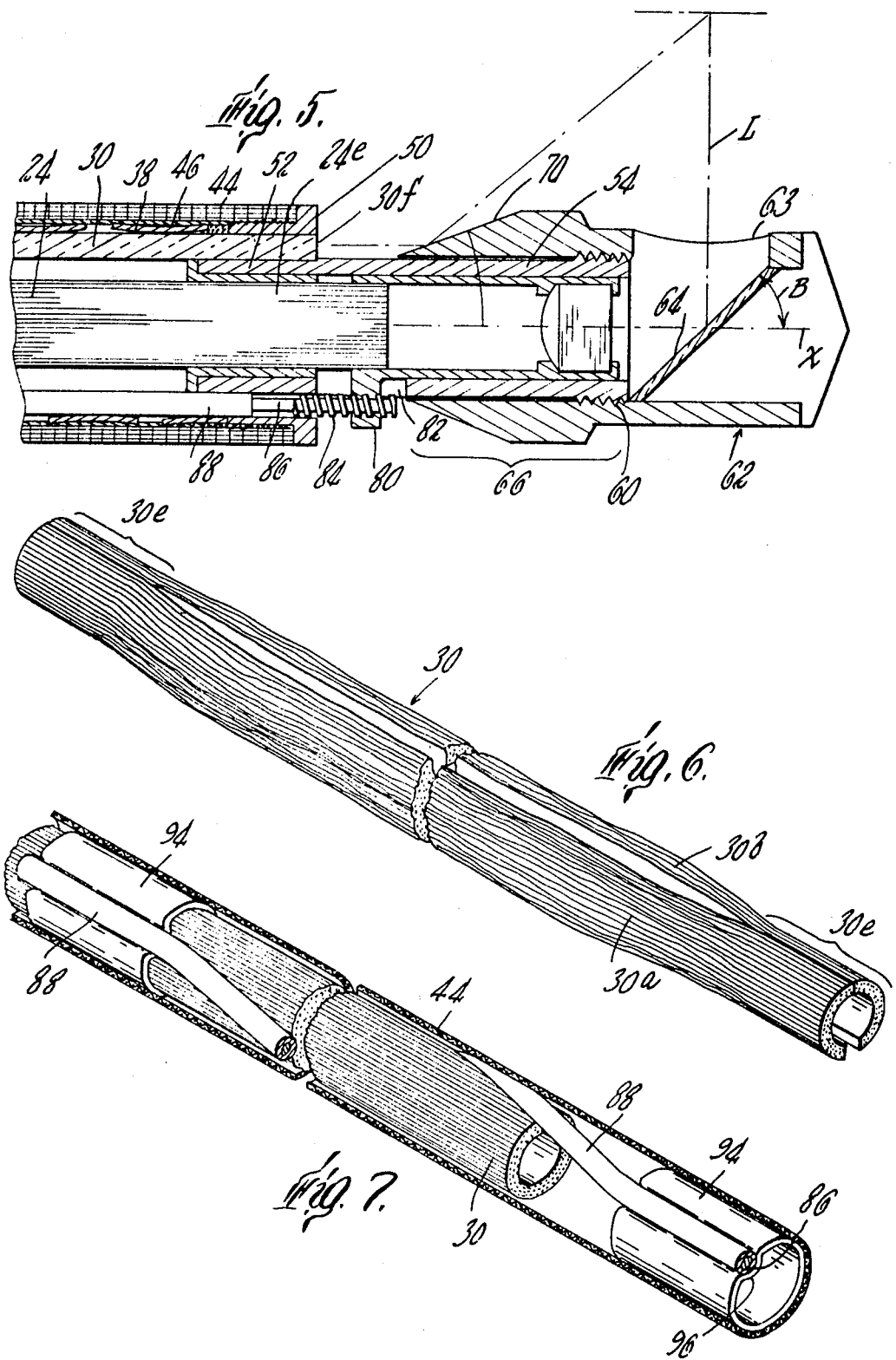

3,434,775
FLEXIBLE FIBER OPTIC BORESCOPE
Norman R. Gosselin, Marblehead, Mass., assignor to Iota-Cam Corporation, Wakefield, Mass., a corporation of Massachusetts
Filed Apr. 23, 1965, Ser. No. 450,417
Int. Cl. G02b 5/14; G01n 21/00; A61b 1/06
U.S. Cl. 350—96            15 Claims

ABSTRACT OF THE DISCLOSURE

Flexible fiber optic borescopes suitable for industrial inspection. A head member mirror for undistorted side viewing transmits the image to a fiber bundle core and an annularly arranged reflector spaced proximally of the mirror guides light from a hollow fiber bundle to directly and indirectly illuminate the viewed side object. Detachment of the head member permits axial viewing. Support of the head member on a cantilever secured between the bundles permits a small size head and unobstructed illumination. Mounting of an objective lens in the support enables focusing for axial as well as side viewing. A rugged cable assembly is provided by a braided cover tightly compressed upon a helical spring. A helical spring having convexly curved inner surfaces directly engages the fibers. Special spacers position the control cable within the spring. A preformed segmented hollow outer fiber section defines a slot for the control cable.

---

This invention relates to means for examining inaccessible areas, and in particular concerns the use of fiber optics for transmitting light to and from such areas.

The principal object of the invention is to provide an improved lighting and viewing fiber optic assembly that is low in cost, durable and efficient, and is capable of adjustment to adapt the mode of viewing to the various physical conditions and obstructions encountered when inspecting inaccessible areas.

Other objects, features and advantages will appear from the following description of a preferred embodiment of the invention taken together with the attached drawings thereof in which FIG. 1 is a longitudinal cross-sectional view of the eyepiece end of the instrument;

FIG. 2 is a longitudinal cross-sectional view of the remote end of the instrument;

FIG. 3 is a longitudinal cross-sectional view, on an enlarged scale, of the body of the instrument taken on line 3—3 of FIG. 1;

FIG. 4 is a transverse cross-sectional view taken on line 4—4 of FIG. 2;

FIG. 5 is a cross-sectional view of the adapter of the invention;

FIG. 6 is a perspective view of the outer bundle arrangement of the invention;

FIG. 7 is a perspective view, partially in cross-section, of the cable construction of the instrument.

Referring now to the drawings a conventional eyepiece 20 is adjustably secured to end member 22. A central optical fiber bundle 24 is disposed within a tubular housing 26 which is connected to end member 22, and the end 28 of this bundle is directed toward the eyepiece 20 in a conventional manner. An outer bundle 30 of flexible fibers is also disposed within tubular housing 26, and its fiber ends are gathered together in a conventional manner, to define a light receiving surface 32.

Referring to FIG. 3, the two bundles 24 and 30 are confined according to the invention by a single helical metal member, consisting simply of a strip of flat spring stock of predetermined dimensions formed into the helical coil shown by a conventional spring winding machine. According to the invention, the stock is of considerable thickness, so that the inside surface of the strip, when the strip 38 is wound upon the mandrel, tends to be confined to a smaller helical path length than the outer surface, due to the difference in radius. The spring metal, being essentially incompressible, reacts to this tendency, causing the strip to curl in the axial direction, as shown in FIG. 3, presenting a convex surface 40 to the inside of the coil and a concave surface 42 to the outside. It is found that by proper selection of the thickness of the stock, depending upon the width $w$ of the strip, the fibers can be exposed directly to the inside surface of the coil while the coil turns are spaced a considerable distance $s$ from one another. It is found that despite substantial bending of the tubular housing, with adjacent spaced apart helical turns thus being axially offset from one another to a considerable degree, that the convex curve of the strip surface prevents the edges of the strip from abrading the fibers.

For a strip having a width $w$ of $3/16''$, and with a spacing $s$ of $1/16''$ between turns, it is found that flat spring stock of .022 inch thickness permits the advantage of this concept. For a strip having a width $w$ of $1/8$ inch, a thickness of .016 inch is appropriate. The width to thickness ratio should be $<10$ to $1$.

The coiled spring 38 is enclosed by a braided metal covering 44, which tightly surrounds the assembly. By being limited against radial contraction, this sheath is rendered inextensible and thus serves as the stretch-limiting means for the system, preventing the assembly from being pulled apart.

In the event the assembly is to be used in a dusty region, or where other contaminants are present that might harm the fibers, an impermeable covering is provided. In the embodiment of the drawings the assembly is adapted for industrial use, with the braided covering 44 exposed, and an impermeable nylon covering 46 is employed, sandwiched between the helical coil 38 and the braided covering 44.

Referring to FIGS. 2, 4 and 6 the outer, illuminating fiber bundle 30 is formed in two sections 30a, 30b, with the remote end portions 30e solidified, e.g. by conventional adhesives, into the form of segments of the same cylinder. These segments are applied to the solidified remote end portion 24e of the central viewing bundle 24, with the optical face 24f of the viewing bundle 24 preferably offset, outwardly from the optical face 30f of the illuminating bundle 30.

An end cap 50 is secured to the remote end of the instrument, e.g. by solder and epoxy, securing the corresponding ends of the braided cover 44 and the spring 38 together, and bonding the outer fiber bundle 30 thereto.

Between the inner and outer fiber bundles 24 and 30 respectively a member 52 is secured, which serves to prevent light from passing between the two bundles in this end area. To the outer end of this member 52, beyond the end face 30f of the illuminating bundle 30, outer member 54 is provided, formed integrally with member 52 but with a larger cross-section, so as to abut to a slight degree the end face 30f, to prevent inward slippage. Inside of outer member 54 is confined a tubular member 56 mounting an objective lens 58. Thus the assembly is adapted for conventional fixed, axial viewing, if that is desired; however, as will now be described, more important modes of viewing are achieved by the present invention.

Referring to FIG. 5, in conjunction with FIG. 2, the end of outer member 54 is provided with external threads 60, to which are threadably secured an adapter member 62 housing a mirror 64 aligned with lens 58 and having a line of sight L set at a considerable angle to the axis X of the instrument. Member 62 is provided with a shank section 66 which extends, rearwardly of threads 60, sliding over the exterior of member, to give added support to the adapter.

According to the invention, the exterior of this shank section is provided with a reflective surface 70 aligned to receive illuminating light from end face 30f of the illuminating bundle 30, and adapted to reflect this light at an angle to the axis X of the instrument, to illuminate an object viewed by mirror 64. Advantageously, as shown, the reflective surface 70 can be a conical surface having a chrome coating. Advantageously, the angle A of this conical surface to the axis of the instrument is less than the angle B of the mirror to the axis, enabling the reflective surface 70 to throw its light forward, to strike objects being viewed by mirror 64.

Despite the fact that the conical surface 70 reflects the light in various side directions it is found that this surface nevertheless is useful for illuminating a side object, due to secondary reflection from other surfaces in the inaccessible region being inspected. Indeed, such illumination can produce secondary shadows that assist in giving definition to the objects being seen through the eyepiece.

In accordance with the invention the objective lens 58 and its carrier member 56 are slidably mounted within outer member 54, for adjusting the focus for objects being viewed with mirror 64. For this purpose a threaded nut 80 is rigidly joined to the carrier 56, extending through a slot 82 in the outer member 54. A threaded drive member 84 engages this nut, and in turn is driven by rotary cable 86 which extends through a nylon extruded sheathing 88. This cable extends inside the instrument to ta remote station 90 at which it is operated by hand knob 92. End portions 30a, 30b define a slot for cable 86.

Certain advantages are achieved by the particular arrangement of the remote operating cable. As was previously mentioned, only a single helical metal spring member is required, this being made possible by special shaping of the helical strip. The considerable thickness of the strip enables the single spring to resist compression, hence allows the braided metal covering to be pulled lengthwise until it tightly compresses inwardly upon the spring, to the point where the spring resists inward contraction, hence enabling the braided cover to serve as the stretch resistant member in the lengthwise direction.

In order to prevent breakage of the fibers, the fibers in the two bundles 30 and 24, in the long region between the two ends are loosely disposed within the space defined by the spring, e.g. occupying on the order of only two thirds of the cross-sectional area of the passage. The fibers are loose, and advantageously, the fibers of the two bundles 24 and 30 are allowed to commingle, so that each fiber can seek its own natural path, in any particular bent configuration of the instrument, in which neither substantial lengthwise tension or compression is applied to the fiber.

According to the invention the remote control cable 86 is placed inside of the spring, exposed to the fibers, which are protected by an anti-fritcion coating on the cable, in this case the nylon sheathing 88.

According to the invention the control cable is confined to the inside periphery of the spring, and is arranged helically, whereby it offers negligible obstruction to the self-adjustment of the fibers. For this purpose a plurality of spacers 94 are provided which, though deformable for insertion into spring 38, press outwardly when released. Referring to FIG. 7 the spacers are advantageously provided with an anti-friction, smooth inside surface, and in this preferred embodiment each comprises a nylon tube of about .010 inch wall thickness, between about ½ and ¾ inches in length and is provided with an inward deformation 96 at one point about its periphery, extending generally in the direction of the axis of the spacer, adapted to confine the cable 86, 88 against the inside surface of spring 38.

According to the invention the distance between spacers can be on the order of one foot, and adjacent spacers are turned relatively to one another, in this instance 180°, so as to confine the cable in a helical fashion, in this case one half turn per foot.

The thus supported cable is prevented from kinking by the spacers when torque is applied. Furthermore, despite the location of the cable at a relatively large distance from the center line of the instrument, coiling of the instrument has a negligible effect upon the axial location of the knob 92. In prior arrangements it was necessary to provide for considerable movement of this cable end due to shortening or lengthening of its over-all path length, due to bending of the elongated instrument. It is also to be noted that this arrangement of the control cable can be employed to advantage with other types of cables, e.g. push-pull cables, or electric power cables, in each case an anti-friction surface can be applied in the regions exposed to contact by the optical fibers.

It will be appreciated that by means of the side view head 62 a full 360° side inspection can be carried out by rotating the view port 63 of the head, by rotating the entire instrument itself. It is true that torque applied to a single coil spring has certain tendencies that would seem to be detrimental, but these are overcome by the braided sheath. Thus if a single coil is turned in the unwind direction it tends to increase in diameter. This however is resisted by the tightly surrounding sheath; if turned in the wind direction, the spring tends to increase in length, but this too is resisted by the tension resistance of the braided cover, in a similarly cooperating manner. The result is that the instrument is well adapted to rotation, particularly as braid 44 resists twisting.

To carry out the 360° inspection, ordinarily the distance to the objects will vary considerably, and this is readily accommodated by the adjustable objective lens, although in other instances other optical provisions can be made for ensuring good focus.

It will be appreciated that, because of the few components and the large ratio of fiber cross-sectional area to total cross-section area, very small diameter but effective instruments are possible, a very important feature of the invention. In some instances, where diameter is not so crucial, it is possible to incorporate more fibers, or to employ additional coverings, for instance to make the instrument pressure-tight. One modification that is possible for large diameters, where the braided cover is obtained by purchase of conventional hydraulic hose, is to employ the pressure-tight inner hose liner for positioning the control cable. For this purpose a spiral slot can be formed along the length of the hose liner, the helical flat wire spring can be inserted within the liner, and the control cables can be inserted in the slot and sandwiched between the braided outer covering and the helical flat wire spring.

Other embodiments will occur to those skilled in the art and are within the following claims.

What is claimed is:

1. In combination flexible optical fiber bundle means having a core section of fibers adapted to transmit a light image from an object being viewed and a surrounding outer section of fibers adapted to transmit light to the vicinity of the end of the core section which receives said light from said object, said fiber bundle means confined in an elongated casing adapted to be disposed in an inaccessible area, a detachable head member secured at the end of said fiber bundle means to a support member, said support member having a diameter less than the diameter of said surrounding outer section of fibers, said head member incorporating a mirror means adapted to receive light from an object located to a side of the axis of said casing and direct an image of said object substanially undistorted into said core section of fibers, said outer section of fibers having an end region defining a light transmitting surface of generally annular form about the axis of said core section, said detachable head member defining a generally annular reflective surface adapted to receive light from said end surface and reflect said light outwardly at an angle to said axis, to illuminate an object being examined by said mirror.

2. The instrument of claim 1 wherein said mirror is located axially closer to the remote end of said instrument than said reflective surface, said reflective surface being opaque and of generally conical form, the angle of said reflective surface to said axis being more acute than the angle of said mirror to said axis, adapted to reflect said light forwardly to the object viewed by said mirror.

3. The instrument of claim 1 including adjustable objective means at the remote end of said core bundle slidably mounted within said support member, control means comprising an elongated cable means for said objective means, said cable means secured in flexible casing means which encloses said fiber bundles.

4. The instrument of claim 3 wherein said fiber bundles are confined within a flexible helically wound hollow spring member, said control cable means located within said hollow spring member and exposed substantially throughout its length to said fibers, said control cable means having an anti-friction outer surface, and said cable means held in a helical path by a plurality of spaced apart spacer members, said spacer members being of tubular form, arranged to press said control cable means outwardly against the inner surface of said spring member, and said fiber bundles extending through said tubular members.

5. The instrument of claim 1 wherein the fibers of said image carrying core section in the region of the distal end of the instrument are bonded rigidly together, the fibers of said light transmitting outer section in the region of the distal end of the instrument are bonded rigidly together in a hollow configuration separate from but surrounding said core section, said support member having an inner portion disposed for support between said core section and said outer section and rigidly secured thereto, said support member protruding outwardly freely therefrom to define the support for said head member.

6. The instrument of claim 5 in which an objective lens assembly is disposed within said support member adapted to focus light passing through said support member onto the end face of said core section.

7. In a fiber optic instrument a casing assembly comprising a single spring comprised of flat steel stock of a width to thickness ratio no greater than about 10 to 1, said stock wound in helical form with the direction of the width generally parallel to the axis of said spring, the configuration of said strip in cross-section being curved, with the convex surface directed inwardly, at least one bundle of optical fibers confined within said spring member and exposed directly thereto, and a braided metal covering surrounding said spring and pulled tightly lengthwise compressing inwardly against said spring, and secured in said condition, said spring resisting further contraction of said cover and said cover resisting elongation of said spring.

8. The combination of claim 7 including a control cable disposed within said spring means, exposed to said fibers, and wherein said control cable is confined against the inside surface of said spring means by a plurality of spacer means distributed along the length of said instrument, the points of engagement of adjacent spacer means with said cable being rotatively displaced about the axis of said spring in the manner confining said cable means to a helical path.

9. The combination of claim 8 wherein said spacer means are formed of anti-friction substance, said spacer members being of generally tubular configuration, an outer portion thereof confining said cable against the inside surface of said spring means, said fiber bundle extending through the tubular passages of said spacer means.

10. In combination first and second light introducing fiber bundles having one pair of corresponding ends adapted to receive light from a source, a second pair of ends formed into rigid, separate segments of a hollow cylinder, said bundles joined together with a separate third central view bundle of fibers which is adapted to transmit an image, said view bundle having its pick-up end of generally cylindrical form, with an optical face provided at the end thereof, said cylinder-segment-form ends joined together substantially concentrically about said cylindrical end of said view bundle, said segments together forming less than a full hollow cylinder of fibers thereby defining a lengthwise extending slot, a control cable means extending along the lengths of said fiber bundles to said pick-up end, said control cable extending lengthwise through said slot, optical adjustment means associated with said view bundle for altering the light rays entering said view bundle, said control cable extending through said slot formed between said two segment-form bundles and connected to operate said adjustment means.

11. The combination of claim 10 wherein said adjustment means comprises an objective lens assembly, said assembly slidably supported solely by a support member, said support member having an inner portion rigidly confined between said view bundle and said segment-form end sections of said outer bundles.

12. A fiber-optic flexible borescope for accurate examination of remote surfaces, comprising an elongated body adapted to be rotated about its axis and bent as it proceeds along its path, and an inspection head member secured to the distal end of said elongated body and adapted to transmit an accurate undistorted image to an eyepiece at the proximal end of said elongated body, a light-image conducting bundle of flexible fibers and a light introducing bundle of fibers extending through said body member from said distal end, the fibers of said light-image conducting bundle of fibers joined together at the distal end as a rigid core, the fibers of said light introducing bundle of fibers joined together at the distal end as a separate rigid hollow cylinder surrounding said core, and said core and said cylinder rigidly joined to the distal end of said elongated body, said head member rigidly secured to the distal end of said elongated body and comprising a mirror disposed at a substantial angle to the axis of said core member, said mirror defining the only means of entry of light to said light image conducting core, said mirror adapted to receive light from an object located to a side of the axis of said elongated body and direct an image of said object substantially undistorted into said core, and a reflective member located proximally from the outward line of sight of said mirror, said reflective member being annularly arranged to receive light from the end face of said cylinder of fibers and to direct light outwardly from the axis to directly and indirectly illuminate the surface being inspected by said mirror.

13. The fiber optic borescope of claim 12 in which a rigid supporting tube is rigidly secured between said fiber core and said fiber hollow cylinder, said supporting tube protruding freely forwardly therefrom as a cantilever, said head member mounted on said tube and having an outer diameter no greater than the diameter of said elongated member.

14. The fiber optic borescope of claim 13 in which said elongated body is substantially incompressible and inextensible and comprises a braided metal outer member and a single elongated spring member tightly surrounded by said sheath, said spring member comprised of flat metal stock wound in helical form with the direction of its width generally parallel to the axis of the spring, the distal ends of said braided outer member and said spring member rigidly joined to each other and to said fiber cylinder.

15. The instrument of claim 12 wherein said fiber bundles are confined within a helically wound hollow spring member which is exposed to directly contact said optical fibers, said spring member comprising a flat metal strip wound helically with the width of said strip extending substantially parallel to the axis of said spring member, the turns of said spring member being spaced apart, said strip having a substantial thickness, said strip in said helical configuration being of substantially curved cross-section, with its convex surface directed inwardly, and with the edges of said strip located radially outwardly relative to the inwardmost portion of the surface of said strip.

References Cited

UNITED STATES PATENTS

| | | | |
|---|---|---|---|
| 3,010,357 | 11/1961 | Hirschowitz | 350—96 |
| 3,132,646 | 5/1964 | Hett | 350—96 X |
| 3,357,423 | 12/1967 | Winchester et al. | 350—96 X |

FOREIGN PATENTS 23,084    5/1962   Germany.

JOHN K. CORBIN, Primary Examiner.

U.S. Cl. X.R.

350—288; 128—6; 240—1; 88—14.